E. OJA.
NON-FREEZING VALVE.
APPLICATION FILED JAN. 16, 1915.
1,187,376.
Patented June 13, 1916.
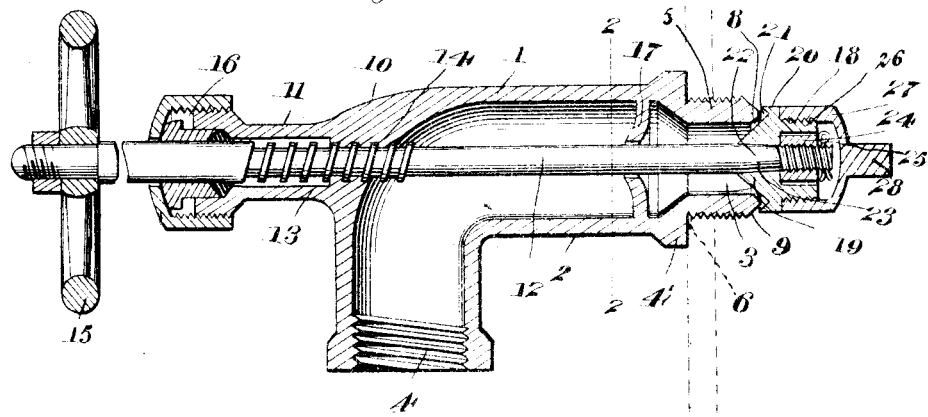
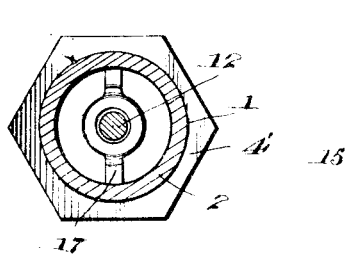
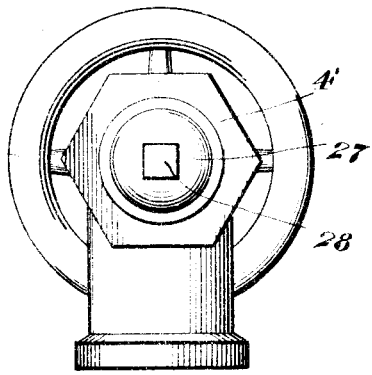
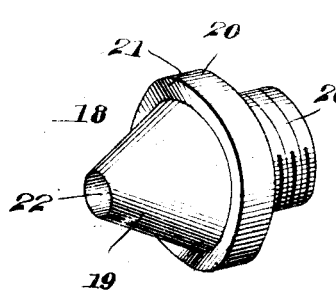
Inventor
Erick Oja,
By Victor J. Evans
Attorney
Witnesses
Frederick W. Ely
C. A. Hines

UNITED STATES PATENT OFFICE.

ERICK OJA, OF ASTORIA, OREGON.

NON-FREEZING VALVE.

1,187,376.

Specification of Letters Patent.

Patented June 13, 1916.

Application filed January 16, 1915. Serial No. 2,715.

*To all whom it may concern:*

Be it known that I, ERICK OJA, a citizen of the United States, residing at Astoria, in the county of Clatsop and State of Oregon, have invented new and useful Improvements in Non-Freezing Valves, of which the following is a specification.

This invention relates to non-freezing valves for steam boilers, and its primary object is to provide a blow-off or similar valve for steam boilers wherein the valve member is disposed within the boiler, thus preventing freezing and bursting of the valve under all conditions, except in the remote contingency of the water freezing within the boiler.

A further object of the invention is to provide a valve structure of this kind where the valve seat and valve are so arranged as mounted as to permit the same to be readily and conveniently removed, ground and reapplied when occasion requires.

The invention consists of the features of construction, combination and arrangement of parts herein fully described and claimed, reference being had to the accompanying drawing in which:—

Figure 1 is a horizontal longitudinal section through a blow-off valve embodying my invention. Fig. 2 is a cross section on the line 2—2 of Fig. 1. Fig. 3 is an end view looking toward the valve seat. Fig. 4 is a detail view of the valve *per se*.

In carrying my invention into practice I provide a substantially elbow-shaped valve casing 1 comprising a body portion 2 having an inlet end 3 disposed in longitudinal alinement therewith, and an outlet 4, disposed at right angles thereto. The inlet end of the casing is formed to provide an angular enlargement or abutment 4' terminating in a tubular externally threaded nipple 5 adapted to fit within a threaded opening 6 in the wall of the boiler 7. The nipple 5 terminates in an end portion which is substantially frusto-conical form in cross section providing inner and outer beveled surfaces 8 and 9. The angular enlargement 4' is adapted for the application of a wrench or other suitable tool whereby the valve casing may be readily applied to and removed from the boiler.

The curved wall 10 of the casing at the angle of intersection of the casing body and outlet end 4 is provided with an extension 11 which is disposed in longitudinal alinement with the axis of the casing body. Through the body 2 and the said extension 11 extends a valve stem 12 which is provided with a threaded surface 13 engaging coacting threads 14 within the extension 11, whereby said stem is adapted when turned in clockwise and counterclockwise directions to be adjusted longitudinally in and out for the purpose of seating and unseating the valve. The outer end of the valve stem is provided with a hand wheel or other suitable operating device 15, and a stuffing box 16 is provided at the outer end of the extension 11 to surround the stem and prevent leakage at that point.

The stem is movable within a supporting and guide member or diaphragm 17 formed or mounted within the casing body, and which is provided with a guide opening of suitable shape and size, and the inner end of the stem extends through and beyond the nipple 5 and carries a valve member 18 for coöperation therewith. This valve member comprises a conical body 19 formed at its base or outer portion with a flange 20 provided with an angular or beveled face 21, the body of the valve being formed with a tapered bore 22 to fit upon a tapered portion 23 of the stem. The valve is held in engagement with this tapered portion of the stem by a nut 24 fitted upon the inner extremity of the stem, which nut is held from displacement by a cotter pin or key 25. The valve is provided with an externally threaded collar 26 which surrounds the nut and is adapted to be engaged by an internally threaded cap 27, whereby the nut and adjacent parts may be inclosed and protected from injury and to a large extent against the access of water thereto. The cap may be provided with a finger piece 28 to facilitate its application and removal.

It will be understood from the foregoing description, that by turning the valve stem in one direction or the other the stem will be longitudinally adjusted to move the valve into and out of closing position. When moved into closing position the conical face of the valve body will be adjusted with relation to the beveled face 8 of the seat portion of the nipple 5, while the angular face 21 will be adjusted with relation to the beveled face 9 of the seat portion, thus giving in effect a double closure of the valve against its seat, whereby a water tight joint is effected. When the valve is adjusted inwardly or moved away from its seat, the casing is placed in communication with the boiler for the discharge of water through the outlet 4.

It will be seen from the construction described that the valve and its seat are arranged wholly within the boiler, and thus can not possibly freeze in cold weather except under the rare contingency that the water in the boiler is frozen. Hence a practically non-freezing valve is provided which will not burst or become clogged by frozen water under any and all normal conditions, and which at the same time may be readily and conveniently applied to and removed from the boiler in its application or removal for the substitution of a new valve or for the purpose of grinding or dressing the valve seat and valve when occasion requires. While the valve is primarily designed for use as a blow-off valve for steam boilers, it may also be employed for other analogous purposes, such as a discharge or controlling valve for water gages, water tanks, etc., wherever there is any danger of the valve in use freezing up.

I claim:—

A valve of the character described comprising a casing having an externally threaded inlet nipple provided with an inner beveled surface forming a valve seat face and an outer beveled surface forming a sealing face, a stem having a tapering end portion with a threaded terminal projecting through the valve casing and beyond the nipple, a valve member upon said tapering end of the stem having a tapered opening receiving the tapering end of the stem and a beveled surface for engagement with the beveled seat face of the nipple, said valve member being also provided with an outwardly extending collar partially inclosing said threaded terminal of the stem and with a flange forming an abutment shoulder at the inner end of the collar and provided with a beveled face arranged at an angle to the beveled face of the valve for engagement with said beveled sealing face of the nipple, a nut upon the threaded terminal of the stem and inclosed within the collar, said nut holding the tapered surfaces of the stem and valve in engagement and a cap in threaded engagement with said collar and surrounding the nut and adjacent end of the stem and abutting against said shoulder.

In testimony whereof I affix my signature.

ERICK OJA.